US005610666A

United States Patent [19]
Ueda et al.

[11] Patent Number: 5,610,666
[45] Date of Patent: Mar. 11, 1997

[54] GAMMA CORRECTING CIRCUIT

[75] Inventors: Goro Ueda; Hiroshi Shiba, both of Tokyo, Japan

[73] Assignee: NEC Corporation, Tokyo, Japan

[21] Appl. No.: 575,147

[22] Filed: Dec. 19, 1995

[30] Foreign Application Priority Data

Dec. 19, 1994 [JP] Japan .................................. 6-315065

[51] Int. Cl.$^6$ .................................................. H04N 5/202
[52] U.S. Cl. ............................................ 348/676; 348/674
[58] Field of Search .................................. 348/674, 675, 348/676, 677, 254, 671; 358/164, 32; H04N 5/202, 9/69, 5/20, 5/208

[56] References Cited

U.S. PATENT DOCUMENTS

| | | | |
|---|---|---|---|
| 4,558,363 | 12/1985 | Sugimoto | 348/676 |
| 5,258,658 | 11/1993 | Morikawa | 307/264 |
| 5,461,430 | 10/1995 | Hagerman | 348/674 |
| 5,483,256 | 1/1996 | Ohi | 345/98 |

FOREIGN PATENT DOCUMENTS

| | | |
|---|---|---|
| 48404 | 4/1984 | Japan . |
| 2-260976 | 10/1990 | Japan . |
| 4091570 | 3/1992 | Japan . |
| 5110899 | 4/1993 | Japan . |

*Primary Examiner*—John K. Peng
*Assistant Examiner*—Chris Grant
*Attorney, Agent, or Firm*—Foley & Lardner

[57] ABSTRACT

A gamma correcting circuit has a plurality of differential amplifiers having respective input terminals for being supplied with a video signal and respective output terminals connected in common. At least one of the differential amplifiers comprises differential pairs of transistors including transistors whose bases are not connected to the input terminal, emitters are connected to respective resistors, and collectors are connected in common. A plurality of individually energizable and de-energizable external reference voltage supplies are connected to the bases of the transistors whose bases are not connected to the input terminal.

3 Claims, 9 Drawing Sheets

5,610,666

GAMMA CORRECTING CIRCUIT

BACKGROUND OF THE INVENTION

1. Field of the Invention

The present invention relates to a gamma correcting circuit for use with a liquid-crystal television receiver or the like, for effecting inverse gamma correction on a video signal and outputting the corrected video signal.

2. Description of the Prior Art

There have been proposed liquid-crystal television receivers which incorporate liquid-crystal display units, rather than cathode-ray tubes, for displaying video images. For displaying video images on liquid-crystal display units based on a video signal such as a television signal intended to be supplied to cathode-ray tubes, it is necessary to process such a video signal because of the difference between the characteristics of liquid-crystal display units and cathode-ray tubes. Specifically, a video signal which has been gamma-corrected according to the illuminance characteristics of the cathode-ray tubes needs to be subjected to inverse gamma correction, thus removing the nonlinearity of the gamma-corrected video signal. After the inverse-gamma-corrected video signal is amplified, it is processed according to the voltage vs. transmittance (V-T) characteristics of the liquid-crystal display units.

FIG. 1 of the accompanying drawings shows a conventional gamma correcting circuit disclosed in Japanese laid-open patent publication No. 260976/90. As shown in FIG. 1, the conventional gamma correcting circuit has an input terminal 1 for introducing a video signal X and an output terminal 2 for outputting a corrected video signal. A buffer transistor Q9 has a collector connected to a voltage power supply VCC, a base connected to the input terminal 1, and an emitter connected to ground through a regulated constant current supply I4. A buffer 3 comprises a buffer amplifier for generating a reference voltage, at a pedestal level of the video signal X, in response to a burst gate pulse P that is applied at a burst period of the video signal X. The buffer 3 has an input terminal connected to the emitter of the transistor Q9 and an output terminal connected to ground through a capacitor C. The capacitor C serves to keep the potential of the output terminal of the buffer amplifier 3 at the reference voltage when the burst gate pulse P is not applied to the buffer amplifier 3.

The conventional gama correcting circuit also has differential amplifiers A, B, C. The differential amplifier A is mainly composed of a differential pair of transistors Q1, Q2 each comprising an NPN transistor. The transistor Q1 has a collector connected to the voltage power supply VCC through a resistor R1, a base connected to the emitter of the transistor Q9, and an emitter connected to a terminal of a constant current supply I1 through a resistor R2. The regulated constant current supply I1 has the other terminal grounded. The transistor Q2 has a collector connected to the voltage power supply VCC through a resistor R10 and also connected to the output terminal 2, an emitter connected to the terminal of the constant current supply I1 through a resistor R3, and a base connected to the junction between the buffer amplifier 3 and the capacitor C.

The differential amplifier B is mainly composed of a differential pair of transistors Q3, Q4 each comprising an NPN transistor. The transistor Q3 has a collector connected to the output terminal 2, a base connected to the emitter of the transistor Q9, and an emitter connected to a terminal of a variable current supply I5 through a resistor R4. The variable current supply I5 has the other terminal grounded. The transistor Q4 has a collector connected to the collector of the transistor Q1, a base connected to the output terminal of the buffer amplifier 3, and an emitter connected to the terminal of the variable constant current supply I5 through a resistor R5. The variable current supply I5 is connected through a control terminal 4 to a variable resistor RA, so that the value of a current supplied by the variable current supply I5 can be varied when the resistance of the variable resistor RA is adjusted.

The differential amplifier C is mainly composed of a differential pair of transistors Q7, Q8 each comprising an NPN transistor. The transistor Q7 has a collector connected to the collector of the transistor Q1, a base connected to the emitter of the transistor Q9, and an emitter connected to a terminal of a variable current supply I6 through a resistor R8. The variable current supply I6 has the other terminal grounded. The transistor Q8 has a collector connected to the output terminal 2, a base connected to the output terminal of the buffer amplifier 3, and an emitter connected to the terminal of the variable constant current supply I6 through a resistor R9. The variable current supply I6 is connected through the control terminal 4 to the variable resistor RA, so that the value of a current supplied by the variable current supply I6 can be varied when the resistance of the variable resistor RA is adjusted.

Operation of the conventional gamma correcting circuit will be described below also with reference to FIGS. 2 through 4 of the accompanying drawings. When a video signal X is supplied to the input terminal 1, a burst gate pulse P synchronous with a burst period of the video signal X is applied to the buffer amplifier 3. In response to the burst gate pulse P, the buffer amplifier 3 generates a constant reference voltage at the pedestal level of the video signal X. At this time, the capacitor C is charged up to the reference voltage. The constant voltage is applied from the buffer amplifier 3 or the capacitor C to the bases of the transistors Q2, Q4, Q8. The video signal X supplied to the input terminal 1 is amplified by the differential amplifiers A, B, C. It is assumed that the differential amplifiers A, B, C have respective input vs. output characteristics indicated by solid-line curves A1, B1, C1, respectively, shown in FIGS. 2 and 3. The conventional gamma correcting circuit outputs, through its output terminal 2, the sum of an output signal (indicated by the solid-line curve A1 shown in FIG. 2) from the differential amplifier A and the sum (indicated by the solid-line curve Y1 shown in FIG. 3) of output signals from the differential amplifiers B, C, i.e., the sum (indicated by the solid-line curve S1 shown in FIG. 4) of the output signals from the differential amplifiers A, B, C.

When the variable resistor RA is adjusted to vary the values of currents supplied by the variable current supplies I5, I6, the conventional gamma correcting circuit operates as follows: When the variable resistor RA is adjusted to reduce the resistance thereof, the input vs. output characteristics of the differential amplifiers B, C vary as indicated by broken-line curves B1a, C1a, respectively, in FIG. 3, varying their output clipping levels. The sum of the output signals from the differential amplifiers B, C now varies as indicated by a broken-line curve Ya in FIG. 3. The sum of the sum of the output signals from the differential amplifiers B, C and the output signal from the differential amplifier A now varies as indicated by a broken-line curve S1a in FIG. 4. When the variable resistor RA is adjusted to increase the resistance thereof, the input vs. output characteristics of the differential amplifiers B, C vary as indicated by broken-line curves B1b, C1b, respectively, in FIG. 3, varying their output clipping levels. The sum of the output signals from the differential amplifiers B, C now varies as indicated by a dotted-line curve Yb in FIG. 3. The sum of the sum of the output signals from the differential amplifiers B, C and the output signal from the differential amplifier A now varies as indicated by a broken-line curve S1b in FIG. 4. Therefore, when the variable resistor RA is adjusted, the input vs. output characteristics of the conventional gamma correcting circuit vary in the directions indicated by the arrow 5 in FIG. 4, thereby gamma-correcting the video signal X.

The conventional gamma correcting circuit has been disadvantageous in that the range in which the output signal from the output terminal 2 is variable is limited, and hence the video signal X may need to be adjusted in level to produce a desired output signal.

SUMMARY OF THE INVENTION

It is therefore an object of the present invention to provide a gamma correcting circuit which is not required to adjust the level of a video signal that is supplied thereto.

According to the present invention, there is provided a gamma correcting circuit comprising a plurality of differential amplifiers, the differential amplifiers having respective input terminals for being supplied with a video signal and respective output terminals connected in common, at least one of the differential amplifiers comprising differential pairs of transistors including transistors whose bases are not connected to the input terminal, emitters are connected to respective resistors, and collectors are connected in common, and a plurality of individually energizable and de-energizable external reference voltage supplies connected to the bases of the transistors whose bases are not connected to the input terminal.

When the external reference voltage supplies connected to the bases of the transistors whose bases are not connected to the input terminal are turned on in a different combination, the gain of the gamma correcting circuit, and the gamma characteristics appear at a different level.

According to an aspect of the present invention, the transistors of the differential pairs in all of the differential amplifiers include transistors whose bases are connected to the input terminal, collectors connected through a common resistor to a power supply terminal, further comprising an output terminal connected to a junction between the collectors and the common resistor, and wherein the transistors of the differential pairs in all of the differential amplifiers have respective emitters connected through respective resistors to constant current supplies having terminals grounded.

According to another aspect of the present invention, the transistors of the differential pairs in all of the differential amplifiers include transistors whose bases are not connected to the input terminal, collectors connected through a common resistor to a power supply terminal, further comprising an output terminal connected to a junction between the collectors and the common resistor, and wherein the transistors of the differential pairs in all of the differential amplifiers have respective emitters connected through respective resistors to constant current supplies having terminals grounded.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 5:
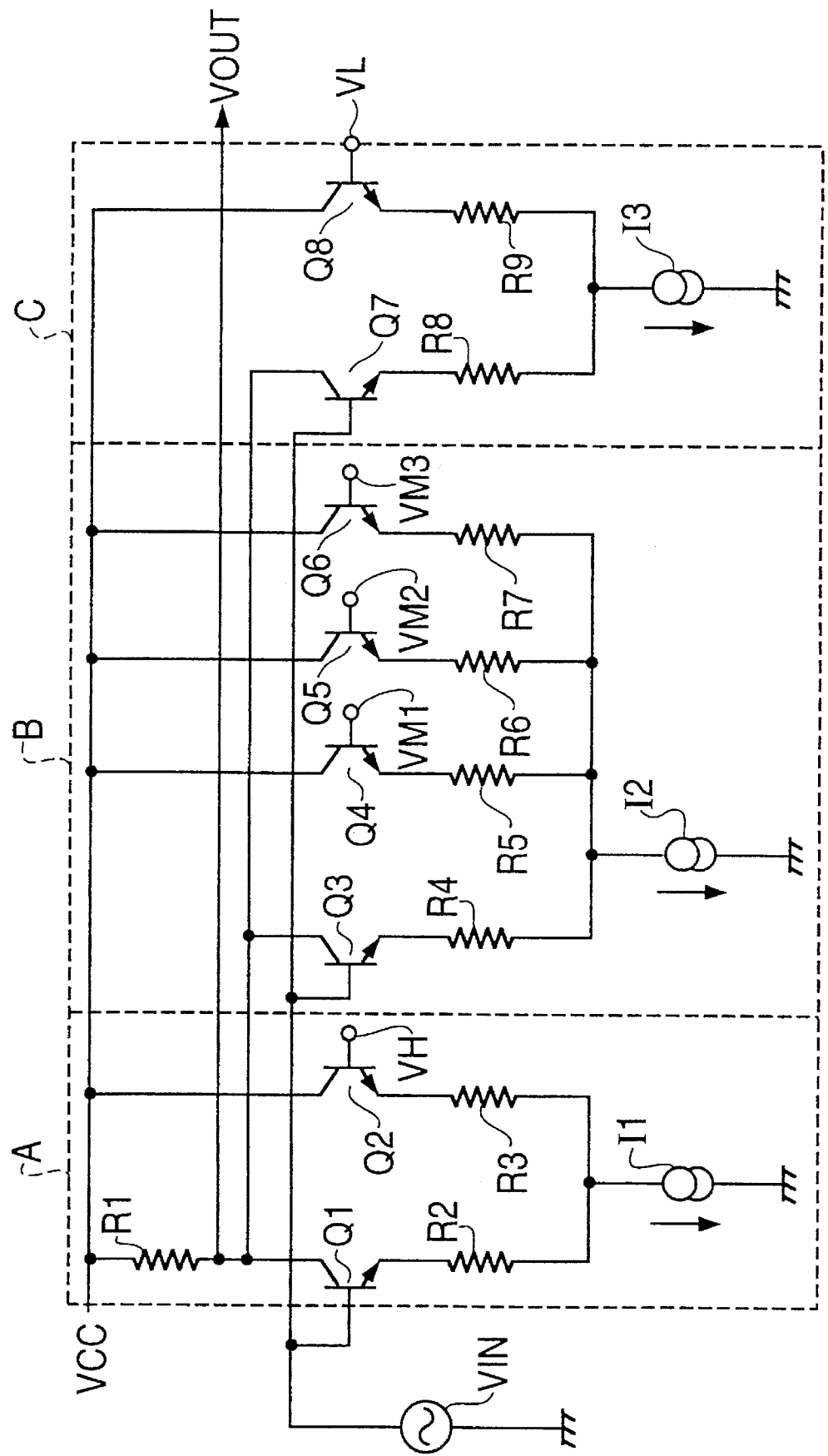
FIG. 5 is a circuit diagram of a gamma correcting circuit according to a first embodiment of the present invention.

FIG. 5 shows a gamma correcting circuit according to a first embodiment of the present invention.

Figure 1:
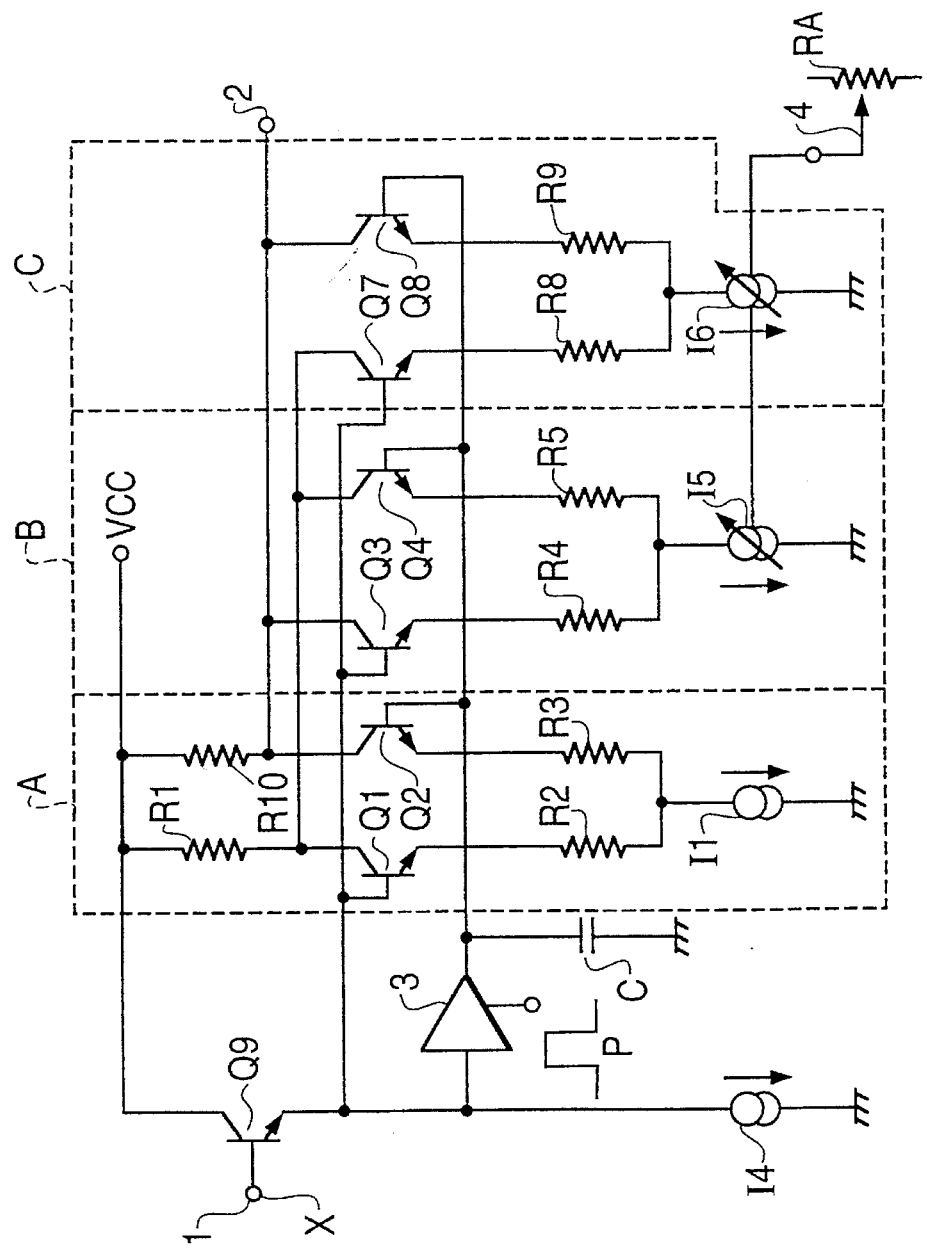
FIG. 1 is a circuit diagram of a conventional gamma correcting circuit.
Figure 2:
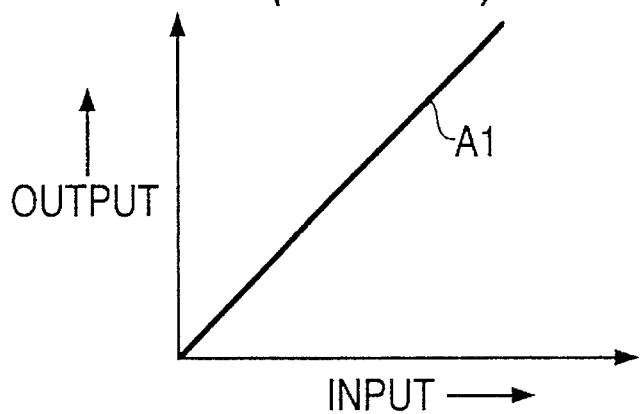
FIG. 2 is a diagram showing the input vs. output characteristics of a differential amplifier A in the conventional gamma correcting circuit shown in FIG. 1.
Figure 3:
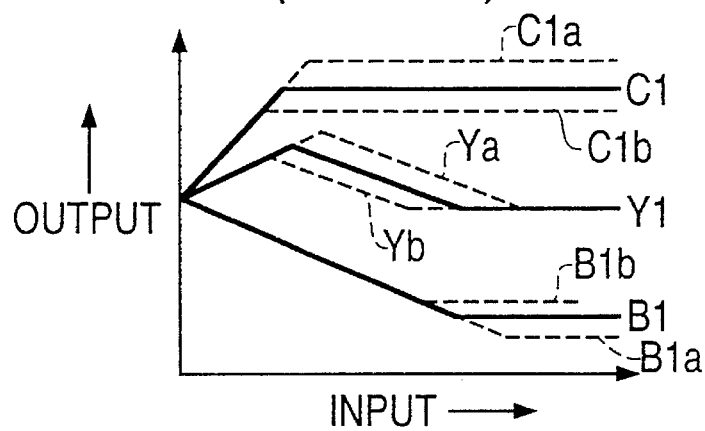
FIG. 3 is a diagram showing the input vs. output characteristics of differential amplifiers B, C in the conventional gamma correcting circuit shown in FIG. 1.
Figure 4:
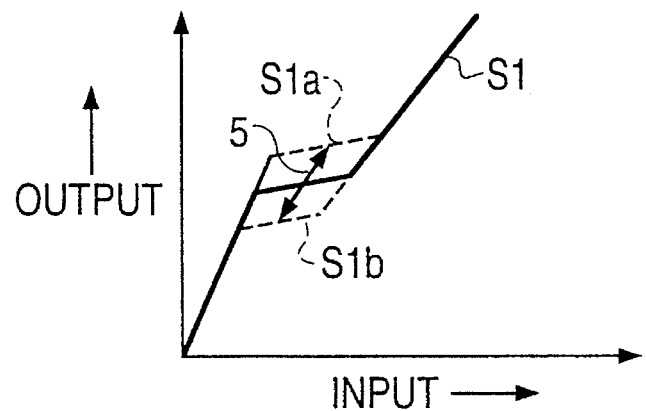
FIG. 4 is a diagram showing the input vs. output characteristics of the conventional gamma correcting circuit shown in FIG. 1.

As shown in FIG. 5, the gamma correcting circuit according to the first embodiment differs from the conventional gamma correcting circuit shown in FIG. 1 as follows: The buffer amplifier 3, the capacitor C, the transistor Q9, the constant current supply I5, the resistor R10, and the variable resistor RA, which are shown in FIG. 1, are removed, constant current supplies I2, I3 are included in place of the respective constant current supplies I5, I6, an output terminal VOUT is connected to a terminal of the resistor R1, rather than the resistor R10 which is removed, the differential amplifier B additionally has a differential pair of transistors Q5, Q6 and a pair of resistors R6, R7, and external reference voltage supplies VH, VM1, VM2, VM3, VL are connected respectively to the bases of the transistors Q2, Q4, Q5, Q6, Q8.

The transistor Q5, which is an NPN transistor, has a collector connected to the collector of the transistor Q4, a base connected to the external reference voltage supply VM2, and an emitter connected to a terminal of the resistor R6 whose other terminal is connected to a terminal of the constant current supply I2. The transistor Q6, which is an NPN transistor, has a collector connected to the collector of the transistor Q4, a base connected to the external reference voltage supply VM3, and an emitter connected to a terminal of the resistor R7 whose other terminal is connected to the terminal of the constant current supply I2.

Figure 6:
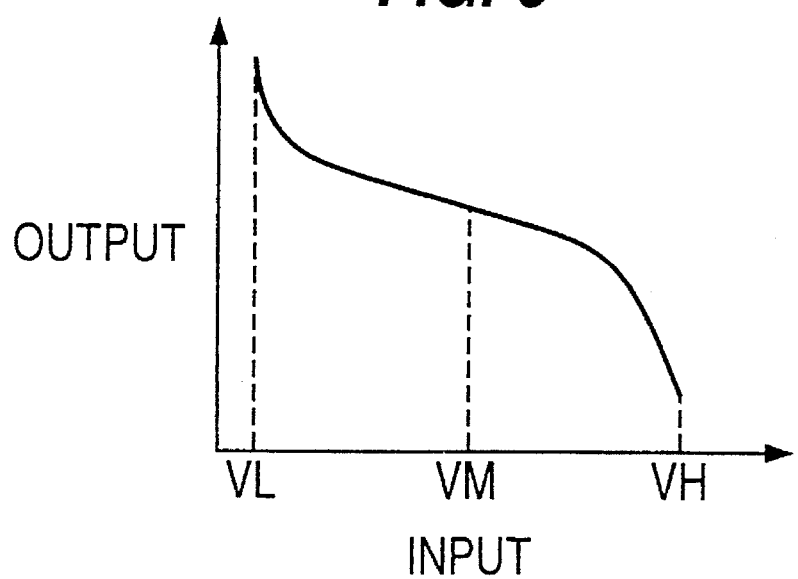
FIG. 6 is a diagram showing the input vs. output characteristics of the gamma correcting circuit shown in FIG. 5.
Figure 7:
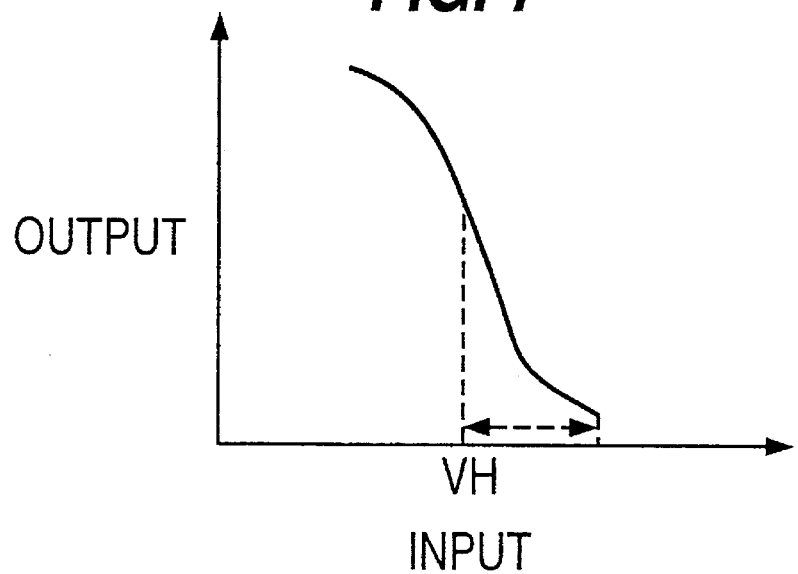
FIG. 7 is a diagram showing the input vs. output characteristics of a differential amplifier A in the gamma correcting circuit shown in FIG. 5.
Figure 8:
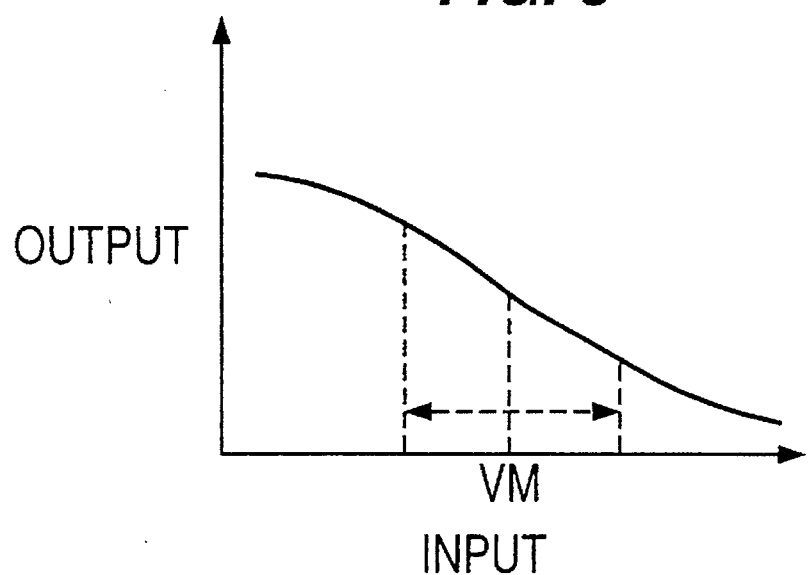
FIG. 8 is a diagram showing the input vs. output characteristics of a differential amplifier B in the gamma correcting circuit shown in FIG. 5.
Figure 9:
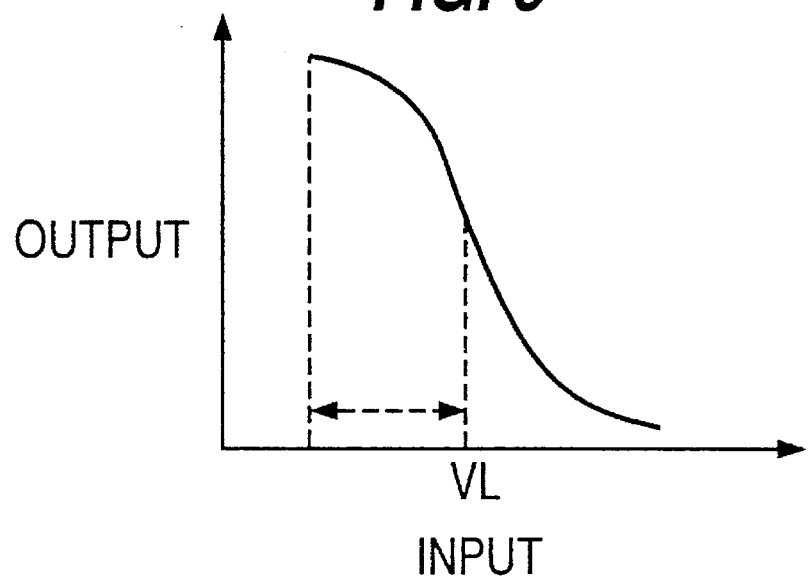
FIG. 9 is a diagram showing the input vs. output characteristics of a differential amplifier C in the gamma correcting circuit shown in FIG. 5.

Operation of the gamma correcting circuit according to the first embodiment will be described below. When a video signal is supplied to an input terminal VIN, it is amplified by the differential amplifiers A, B, C. If the differential amplifiers A, B, C have respective input vs. output characteristics shown in FIGS. 7, 8, 9, respectively, then when the input voltage of the video signal is in the range from VL to VH (see FIG. 6), the gamma correcting circuit outputs, through the output terminal VOUT, the sum of output signals from the differential amplifiers A, B, C as shown in FIG. 6, i.e., the sum of output signals indicated by the arrows in FIGS. 7, 8, 9.

When the external reference voltage supplies VM1, VM3 connected respectively to the bases of the transistors Q4, Q6 are turned off and the external reference voltage supply VM2 connected to the base of the transistor Q5 is turned on, the gain G of the differential amplifier B is expressed by:

$$G=R1/(r0+R4+R6)$$

where r0 is the impedance of the NPN transistor.

When the external reference voltage supply VM3 is turned on and the external reference voltage supply VM2 is turned off, the gain G of the differential amplifier B is expressed by:

$$G=R1/(r0+R4+R7).$$

When all the external reference voltage supplies VM1, VM2, VM3 are turned on, the gain G of the differential amplifier B is expressed by:

$$G=R1/\{r0+(R4+R5//R6//R7)\}.$$

Figure 10:
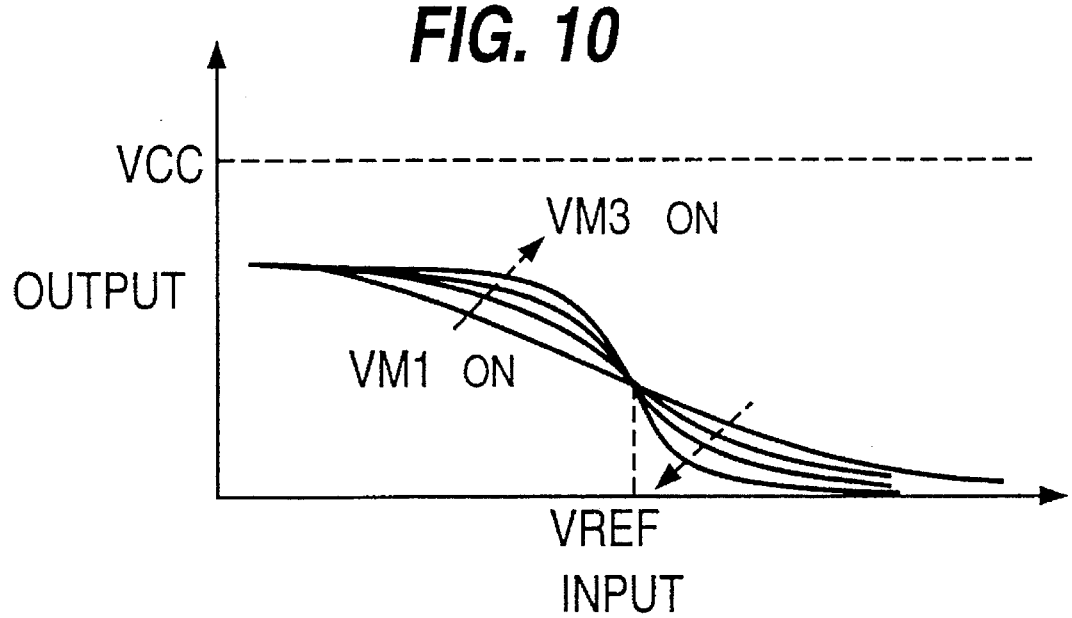
FIGS. 10 and 11 are diagrams showing the input vs. output characteristics of the gamma correcting circuit shown in FIG. 5.
Figure 11:
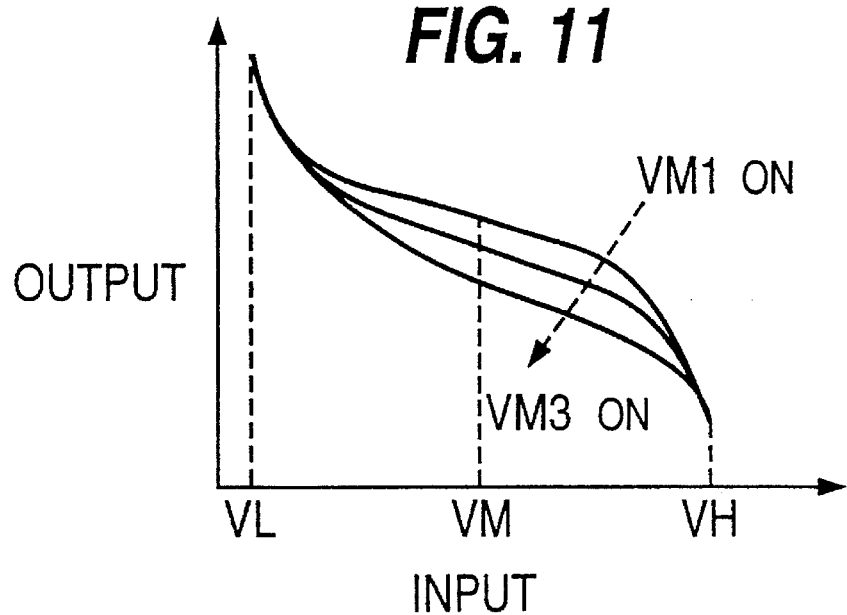

If the values of the resistors R5, R6, R7 satisfy the following relationship:

$$R5>R6>R7,$$

then the gain G of the differential amplifier B varies as shown in FIG. 10 upon energization of the external reference voltage supplies VM1, VM2, VM3. Consequently, it is possible to set the gamma-corrected value to a desired arbitrary value as shown in FIG. 11, which shows the gain of the gamma correcting circuit shown in FIG. 5 as it varies when the external reference voltage supplies VM1, VM2, VM3 are alternately turned on.

According to the first embodiment, since the three resistors R5, R6, R7 are connected parallel to the resistor R4, it is possible to obtain $2^3-1=7$ gains for the gamma correcting circuit.

Figure 12:
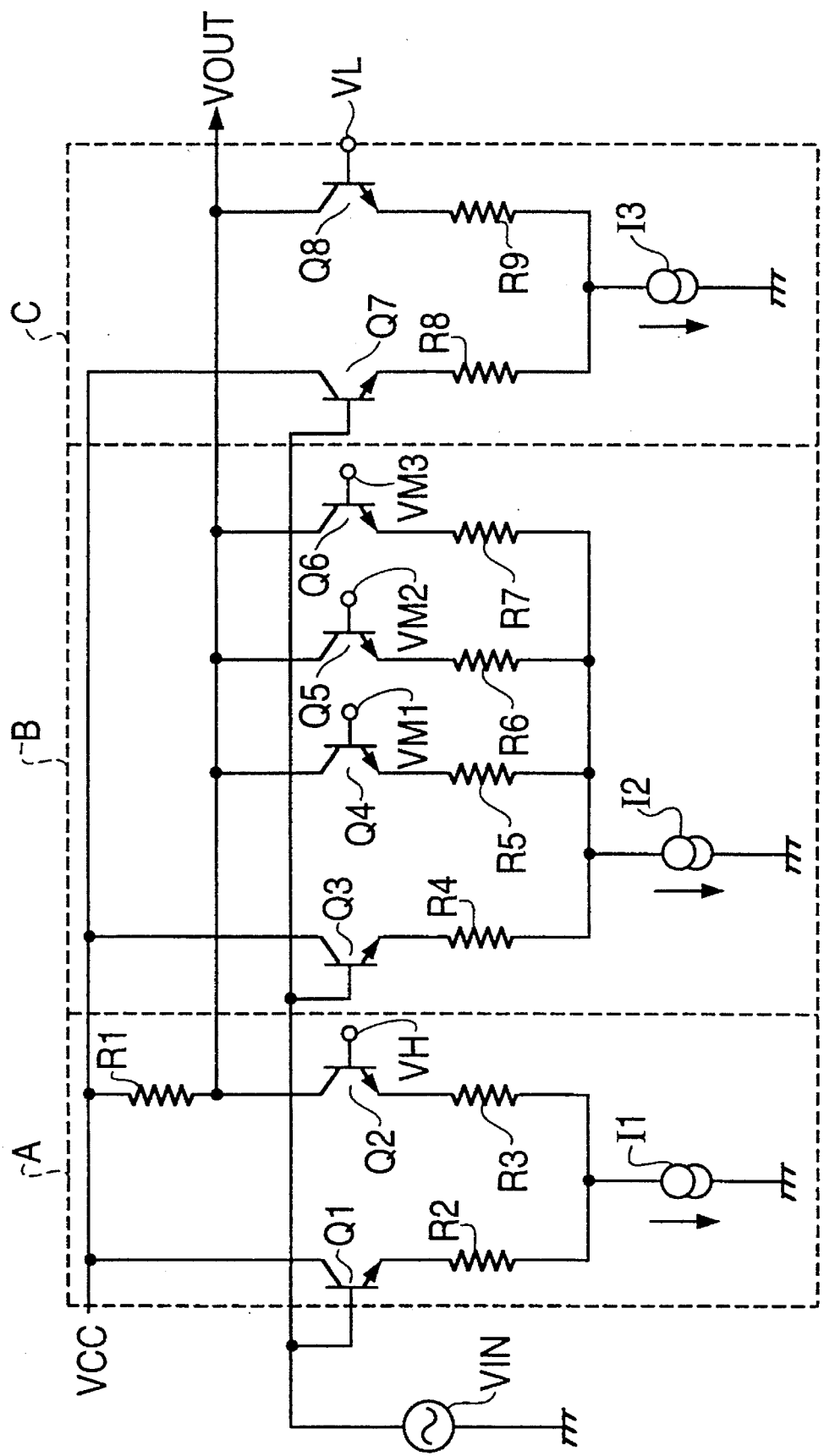
FIG. 12 is a circuit diagram of a gamma correcting circuit according to a second embodiment of the present invention.
Figure 14:
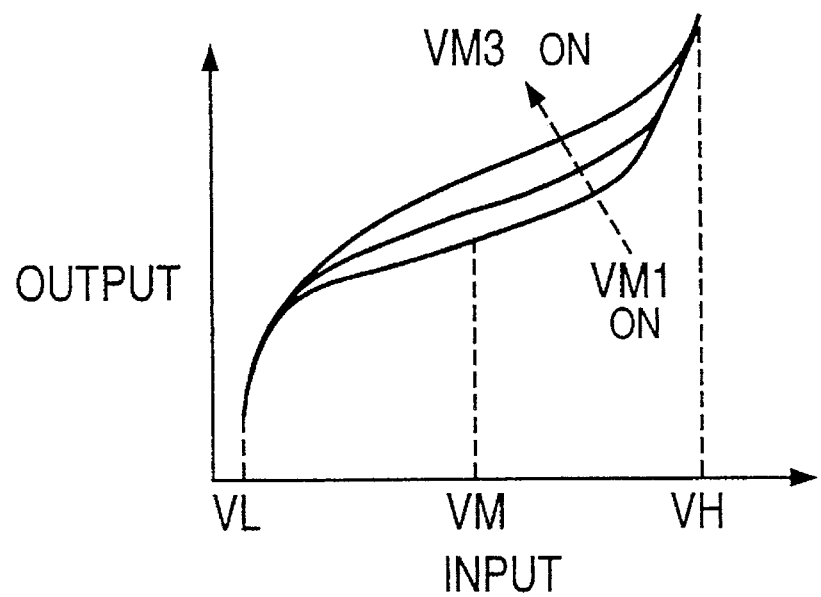
FIG. 14 is a diagram showing the input vs. output characteristics of the gamma correcting circuit shown in FIG. 12.

FIG. 12 shows a gamma correcting circuit according to a second embodiment of the present invention, and FIG. 14 shows the input vs. output characteristics of the gamma correcting circuit shown in FIG. 12.

The gamma correcting circuit shown in FIG. 12 differs from the gamma correcting circuit shown in FIG. 5 in that the resistor R1 is connected between the voltage power supply VCC and the collector of the transistor Q2, and the collectors of the transistors Q2, Q4, Q5, Q6, Q8 are connected to the output terminal VOUT. The gamma correcting circuit shown in FIG. 12 operates as shown in FIG. 14. When the external reference voltage supplies VM1, VM2, VM3 are all turned on, the gain G is expressed by:

$$G=R1/(r0+R4+R5//R6//R7).$$

Figure 13:
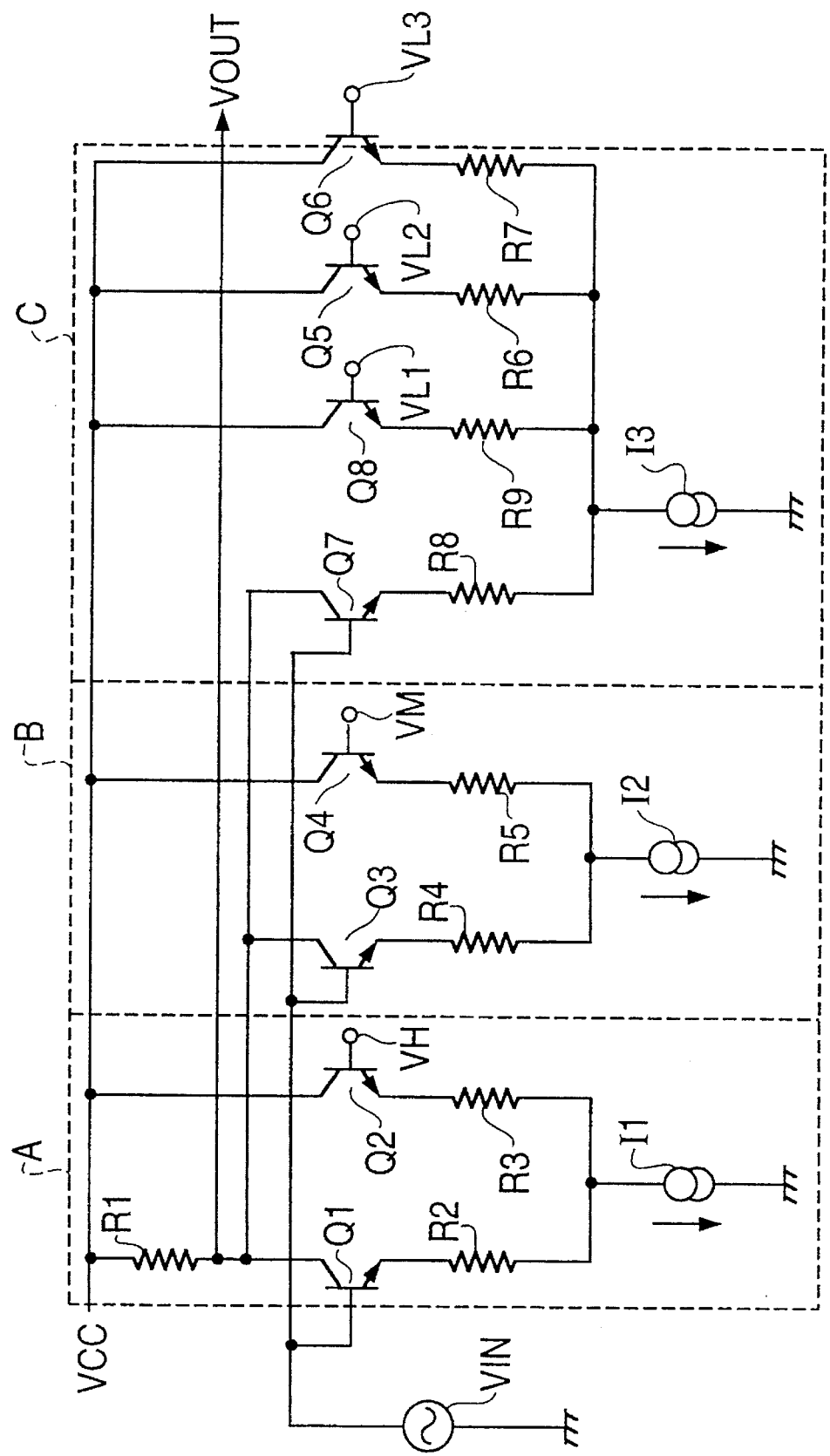
FIG. 13 is a circuit diagram of a gamma correcting circuit according to a third embodiment of the present invention.
Figure 15:
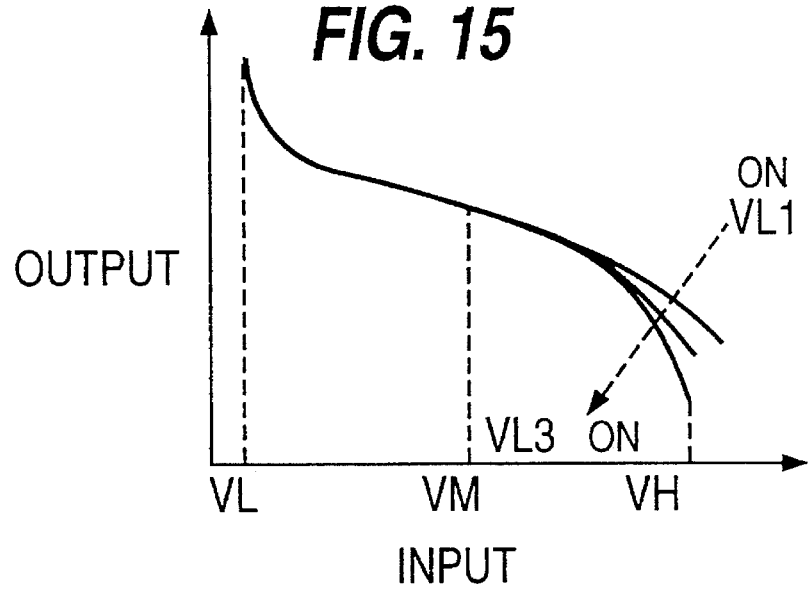
FIG. 15 is a diagram showing the input vs. output characteristics of the gamma correcting circuit shown in FIG. 13.

FIG. 13 shows a gamma correcting circuit according to a third embodiment of the present invention, and FIG. 15 shows the input vs. output characteristics of the gamma correcting circuit shown in FIG. 13.

The gamma correcting circuit shown in FIG. 13 differs from the gamma correcting circuit shown in FIG. 5 in that the transistors Q5, Q6 and the resistors R6, R7 are removed from differential amplifier B and added to the differential amplifier C, with external reference voltage supplies VM, VL1, VL2, VL3 are connected to the respective bases of the transistors Q4, Q8, Q5, Q6. The gamma correcting circuit shown in FIG. 13 operates as shown in FIG. 15. When the external reference voltage supplies VL1, VL2, VL3 are all turned on, the gain G is expressed by:

$$G=R1/(r0+R8+R9//R6//R7).$$

In each of the above embodiments, the gamma correcting circuit has three differential amplifiers and the differential pairs include three transistors whose bases are not connected to an external reference voltage supply. However, the present invention is not limited to the illustrated gamma correcting circuits which have three differential amplifiers and whose differential pairs include three transistors whose bases are not connected to an external reference voltage supply. Furthermore, a gamma correcting circuit may include a plurality of differential amplifiers, among others, each of which has a plurality of transistors in differential pairs whose bases are not connected to the input terminal.

While preferred embodiments of the present invention have been described using specific terms, such description is for illustrative purposes only, and it is to be understood that changes and variations may be made without departing from the spirit or scope of the following claims.

What is claimed is:

1. A gamma correcting circuit comprising:

a plurality of differential amplifiers;

said differential amplifiers having respective input terminals for being supplied with a video signal and respective output terminals connected in common;

at least one of said differential amplifiers comprising differential pairs of transistors including transistors whose bases are not connected to the input terminal, emitters are connected to respective resistors, and collectors are connected in common; and a plurality of individually energizable and de-energizable external reference voltage supplies connected to the bases of said transistors whose bases are not connected to the input terminal.

2. A gamma correcting circuit according to claim 1, wherein said transistors of the differential pairs in all of said differential amplifiers include transistors whose bases are connected to the input terminal, collectors connected through a common resistor to a power supply terminal, further comprising an output terminal connected to a junction between said collectors and said common resistor, and wherein said transistors of the differential pairs in all of said differential amplifiers have respective emitters connected through respective resistors to constant current supplies having terminals grounded.

3. A gamma correcting circuit according to claim 1, wherein said transistors of the differential pairs in all of said differential amplifiers include transistors whose bases are not connected to the input terminal, collectors connected through a common resistor to a power supply terminal, further comprising an output terminal connected to a junction between said collectors and said common resistor, and wherein said transistors of the differential pairs in all of said differential amplifiers have respective emitters connected through respective resistors to constant current supplies having terminals grounded.

* * * * *